United States Patent [19]

Selwitz et al.

[11] 4,118,244

[45] Oct. 3, 1978

[54] PARAFFIN WAX COMPOSITION

[75] Inventors: Charles M. Selwitz, Monroeville; Helen I. Thayer, Oakmont, both of Pa.

[73] Assignee: Gulf Research & Development Company, Pittsburgh, Pa.

[21] Appl. No.: 807,370

[22] Filed: Jun. 17, 1977

[51] Int. Cl.$^2$ .............................................. C08L 91/06
[52] U.S. Cl. ................................. 106/270; 260/346.74
[58] Field of Search ....................... 106/270, 271, 272; 44/7.5; 208/24; 260/346.74

[56] References Cited

U.S. PATENT DOCUMENTS

| 2,890,125 | 9/1959 | Mange ..................................... 106/23 |
| 3,590,076 | 6/1971 | Heintzelman et al. ........... 260/346.74 |

*Primary Examiner*—Theodore Morris

[57] ABSTRACT

A paraffin wax composition of improved hardness comprising paraffin wax and an alkenyl succinic acid or alkenyl succinic anhydride.

5 Claims, No Drawings

PARAFFIN WAX COMPOSITION

BACKGROUND OF THE INVENTION

1. Field of the Invention

This invention relates to a paraffin wax composition of improved hardness comprising paraffin wax and an alkenyl succinic acid or alkenyl succinic anhydride.

2. Description of the Prior Art

Paraffin waxes possess great commercial utility, for example, in coatings, candles, etc. However, because paraffin wax is relatively soft, it has been customary to add hardening agents such as stearic acid; stearine (a commercial stearicpalmitic acid mixture), hydroxystearic acid, and a variety of natural waxes, such as carnauba, Montan wax, and ceresine (a purified ozocerite), to paraffin wax to improve its hardness and thereby increase its utility.

SUMMARY OF THE INVENTION

We have found that we can substantially increase the hardness of paraffin wax by incorporating therein selected amounts of (1) a specific alkenyl succinic acid or alkenyl succinic anhydride, (2) combinations of said acids, (3) combinations of said anhydrides and (4) combinations of said acids and said anhydrides.

By "paraffin wax" we mean to include waxes derived from petroleum having the following characteristics:

TABLE I

| | |
|---|---|
| Melting Point | 50 to 80° C. |
| Viscosity at 210° F. (99° C.) | |
| SUS (D88) | 36 to 52 |
| Oil Content (D721) | 0.3 to 0.4 |
| Penetration | |
| 77° F. (25° C.) | 11 to 17 |
| 100° F. (37.8° C.) | 30 to 95 |
| Molecular Weight | 280 to 1400 |
| Carbon No | 20 to 100 |

The alkenyl succinic acid used herein can be one having the following structural formula:

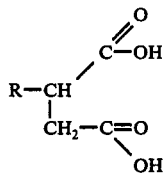

wherein R is an alkenyl group, straight or branched, but preferably straight, having from 26 to 100 carbon atoms, preferably from 30 to 60 carbon atoms.

The alkenyl succinic anhydride used herein can be one having the following structural formula:

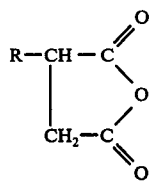

wherein R is an alkenyl group as defined above.

Any conventional procedure known in the art can be employed in preparing the above alkenyl succinic acids or alkenyl succinic anhydrides. One procedure for preparing the alkenyl succinic anhydride could involve reacting, with stirring, a mixture of a straight or branched olefin and maleic anhydride at a molar ratio of olefin to maleic anhydride of about 0.5:1 to about 2:1, preferably about 0.8:1 to about 1.25:1 at a temperature of about 140° to about 250° C., perferably about 180° to about 220° C., and a pressure of about 0.1 to about 1000 pounds per square inch gauge (about 0.007 to about 70.3 kilograms per square centimeter) preferably about 10 to about 20 pounds per square inch gauge (about 0.7 to about 1.4 kilograms per square centimeter) for about three to about 60 hours, preferably about six to about 24 hours. The olefin used for reaction with maleic anhydride can be obtained from any suitable source, but preferably is obtained by polymerizing ethylene in the presence of an aluminum alkyl catalyst, for example, as in U.S. Pat. No. 3,482,000 to Fernald et al, or by cracking petroleum stocks, and paraffinic materials, such as microcrystalline wax and polyethylene. To separate any unreacted components that may be present the reaction mixture can be subjected to distillation at a temperature of about 150° to about 250° C., preferably about 180° C. to about 220° C., and a pressure of about 0.01 to about 10 pounds per square inch gauge (about 0.0007 to about 0.7 kilograms per square centimeter), preferably about 0.1 to about 0.5 pounds per square inch gauge (about 0.007 to about 0.035 kilograms per square centimeter). The alkenyl succinic anhydride can be converted to the corresponding alkenyl succinic acid by any conventional procedure, for example by contacting one mol of the anhydride with about 10 to about 10,000 mols, preferably about 50 to about 500 mols, of water at a temperature of about 0° to about 80° C., preferably about 5° to about 40° C., and a pressure of about five to about 1000 pounds per square inch gauge (about 0.35 to about 70 kilograms per square centimeter), preferably about 10 to about 20 pounds per square inch gauge (about 0.7 to about 1.4 kilograms per square centimeter) for about 0.01 to about 100 hours, preferably about 0.1 to about 10 hours. A preferred procedure for preparing alkenyl succinic acids and alkenyl succinic anhydrides is disclosed in our copending application Ser. No. 807,369 entitled Process for Preparing Alkenyl Succinic Acids and Alkenyl Succinic Anhydrides, filed concurrently herewith.

The amount of alkenyl succinic anhydride or alkenyl succinic acid incorporated into the paraffin wax can vary over wide limits. Thus, based on the weight of the final composition, the amount of alkenyl succinic anhydride or alkenyl succinic acid can be as low as about 0.2 weight percent, but generally is about one to about 40 weight per cent. In most cases there is no need to have more than about 50 weight percent of alkenyl succinic anhydride or alkenyl succinic acid, preferably no more than about 10 weight percent.

DESCRIPTION OF PREFERRED EMBODIMENTS

The novel paraffin wax compositions claimed herein can further be illustrated by the following examples. The alpha olefin mixture used in the examples was a fraction obtained from the product resulting from the telomerization of ethylene in the presence of triethyl aluminum at a temperature of about 200° C. and a pressure of about 3400 pounds per square inch gauge (about 239 kilograms per square centimeter) over a period of about 30-60 minutes and is further defined below in Table II.

TABLE II

| Isomer Distribution | Per Cent by Weight |
|---|---|
| Vinyl | 70.9 |
| Vinylidene | 20.6 |
| Cis | 2.1 |
| Trans | 4.3 |
| Saturates | 2.0 |
| Iodine Number | 47.3 |
| Average Molecular Weight | 529 (corresponds to 37.8 C) |
| Penetration, ASTM, D1321 | 12 (25° C.) |
|  | 28 (38° C.) |
| Color, Saybolt, ASTM D156 | +16 (white) |
| Melting Range, ° C. | 55–75 |

EXAMPLE I

To 1985 parts of the alpha olefin mixture defined above in a closed flask there was added 404.3 grams of maleic anhydride. At ambient pressure the mixture was heated with stirring to 85° C., flushed with nitrogen and the temperature was raised to 200° to 210° C. After a twenty-hour period, the pressure was reduced to 10 millimeters of mercury and 58.7 grams of maleic anhydride was recovered. The mixture was then cooled to 100° C. and poured into seven liters of water with stirring. Upon cooling, the product solidified into finely-granulated particles. This material was filtered and a very dark-colored wash water was separated by vacuum filtration. Washing was continued with several liters of water until the last portion of wash water was colorless. The solid was spread on stainless steel trays and dried in a vacuum oven operated at 80° C. and then at 102° C.

EXAMPLE II

To a closed 12-liter reaction vessel 4764 grams of the alpha olefin mixture identified above and 993 grams of maleic anhydride were charged. The mixture was melted, flushed with nitrogen and heated at ambient pressure under nitrogen at 180° to 200° C. for 12 hours. Upon evacuation of the reaction mixture to 15 millimeters of mercury, a very small amount of anhydride was obtained. The mixture was cooled to 100° C. and poured into 20 liters of water. After cooling the product was separated by centrifuging and then repeatedly washed until the wash water was colorless and its pH was 7. The product was dried in a vacuum oven at 80°–102° C. on stainless steel trays. The combined alkenyl succinic acid obtained from Examples I and II amounted to 7800 grams.

EXAMPLE III

The combined product from Examples I and II were mixed and blended at 85° C. and the warm mixture was allowed to stand at 85° C. for 30 minutes. The molten blend was then decanted into trays, cooled and ground. Twenty-five grams of this material were azeotroped in 100 grams of xylene at a temperature of 135° C. and a pressure of 14.8 pounds per square inch gauge (1.04 kilograms per square centimeter), resulting in a loss of 1.2 grams of water. 23.5 grams of alkenyl succinic anhydride were obtained.

EXAMPLE IV

Blends were prepared containing paraffin wax and various amounts of the following: (1) stearic acid, (2) the specific $C_{30}+$ alpha olefin mixture defined above, (3) the specific alkenyl succinic acid prepared above, (4) the specific alkenyl succinic anhydride prepared above, (5) a physical mixture containing 0.78 weight percent of maleic anhydride and 4.22 weight percent of the specific $C_{30+}$ alpha olefin mixture defined above and (6) isooctadecenyl succinic anhydride. The blends were prepared by mixing the ingredients at 90° C. and ambient pressures for 60 minutes. The specific paraffin wax used in preparing the blends is defined below in Table III.

TABLE III

| Melting Point | 53° C. |
|---|---|
| Viscosity at 210° F. (99° C.) SUS (D88) | 37.8 |
| Oil Content (D721) | 0.3 |
| Penetration |  |
| 77° F. (25° C.) | 9 |
| 100° F (37.8° C.) | 98 |
| Molecular Weight | 280–500 |
| Carbon No | 20–36 |

The data obtained are tabulated below in Table IV. The amounts indicated therein are in grams.

TABLE IV

| Blend No. | Paraffin Wax | Stearic Acid | $C_{30+}$ Alpha Olefin | Alkenyl Succinic Acid | Alkenyl Succinic Anhydride | Physical Mixture Of Maleic Anhydride and $C_{30+}$ alpha Olefins | Isooctadecenyl Succinic Anhydride | Penetration 100° F (38° C) D1321 |
|---|---|---|---|---|---|---|---|---|
| 1 | 100 | — | — | — | — | — | — | 98 |
| 2 | 95 | 5 | — | — | — | — | — | 84 |
| 3 | 85 | 15 | — | — | — | — | — | 60 |
| 4 | 70 | 30 | — | — | — | — | — | 56 |
| 5 | 95 | — | 5 | — | — | — | — | 98 |
| 6 | 95 | — | — | 5 | — | — | — | 41 |
| 7 | 97 | — | — | 3 | — | — | — | 62 |
| 8 | 99 | — | — | 1 | — | — | — | 68 |
| 9 | 95 | — | — | — | 5 | — | — | 51 |
| 10 | 95 | — | — | — | — | 5 | — | 76 |
| 11 | 95 | — | — | — | — | — | 5 | 195 |

The data in Table IV amply illustrates the uniqueness of the present invention. The lower the penetration values the harder is the paraffin wax mixture. Note that paraffin wax alone has a penetration value of 98. The addition of stearic acid in small amounts to the paraffin wax slightly improved its hardness. The addition of large amounts of stearic acid was required to appreciably increase the hardness of the paraffin wax. In Blend No. 5 the use of a $C_{30+}$ olefin fraction alone was completely ineffective for the desired purpose. The use of but a small amount of alkenyl succinic acid in Blend No. 6 was enough to greatly increase the hardness of the paraffin wax. In fact in Blends Nos. 6, 7 and 8 the use of a very small amount of alkenyl succinic acid was about as effective for the stated purposes as about ten times or more of stearic acid in Blends Nos. 2, 3 and 4. Although the alkenyl succinic acid was more effective than alkenyl succinic anhydride, the results obtained with the latter in Blend No. 9 were far greater than those obtained using stearic acid. That a physical mixture of maleic anhydride and alpha olefins is not effective can be seen from Blend No. 10. That the number of carbon atoms in the alkenyl portion of the alkenyl succinic acid of anhydride is critical is apparent from Blend No. 11 wherein the alkenyl portion contained 18 carbon atoms and the resultant blend had a much higher penetration value than the paraffin wax itself.

Obviously, many modifications and variations of the invention, as hereinabove set forth, can be made without departing from the spirit and scope thereof, and therefore only such limitations should be imposed as are indicated in the appended claims.

We claim:

1. A paraffin wax composition of improved hardness comprising paraffin wax and an alkenyl succinic compound selected from the group consisting of an alkenyl succinic anhydride and the corresponding alkenyl succinic acid wherein the alkenyl portion thereof contains from about 30 to about 60 carbon atoms, said alkenyl succinic anhydride having been obtained by reacting maleic anhydride with an olefinic fraction having from 30 to 60 carbon atoms, said olefinic fraction having been obtained by the ploymerization of ethylene.

2. The composition of claim 1 wherein said alkenyl succinic compound is an alkenyl succinic anhydride.

3. The composition of claim 1 wherein said alkenyl succinic compound is an alkenyl succinic acid.

4. The composition of claim 1 wherein the amount of said alkenyl succinic compound in the composition amounts to about 0.2 to about 50 weight percent.

5. The composition of claim 1 wherein the amount of said alkenyl succinic compound in the composition amounts to about one to about 40 weight percent.

* * * * *